(12) United States Patent
Kim

(10) Patent No.: US 11,682,366 B2
(45) Date of Patent: Jun. 20, 2023

(54) DISPLAY DEVICE INCLUDING OPTICAL SENSOR AND MEASUREMENT METHOD FOR LOCATION OF OPTICAL SENSOR

(71) Applicant: Samsung Display Co., Ltd., Yongin-si (KR)

(72) Inventor: Kee Yong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/341,219

(22) Filed: Jun. 7, 2021

(65) Prior Publication Data

US 2022/0005437 A1    Jan. 6, 2022

(30) Foreign Application Priority Data

Jul. 6, 2020   (KR) ........................ 10-2020-0083050

(51) Int. Cl.
*G09G 5/10*   (2006.01)
*G09G 3/20*   (2006.01)

(52) U.S. Cl.
CPC ................ *G09G 5/10* (2013.01); *G09G 3/20* (2013.01); *G09G 2320/0686* (2013.01); *G09G 2360/145* (2013.01)

(58) Field of Classification Search
None
See application file for complete search history.

(56) References Cited

U.S. PATENT DOCUMENTS

| 7,400,750 | B2 | 7/2008 | Nam | |
|---|---|---|---|---|
| 9,672,405 | B2 | 6/2017 | Lin | |
| 10,296,771 | B2 | 5/2019 | Zhang | |
| 10,643,048 | B2 | 5/2020 | Pang et al. | |
| 2006/0023078 | A1* | 2/2006 | Schmitt | H04N 5/32 348/222.1 |
| 2018/0188554 | A1* | 7/2018 | Iwami | G06F 3/0445 |
| 2019/0197931 | A1 | 6/2019 | Kim | |
| 2020/0143135 | A1* | 5/2020 | Kim | G06V 10/30 |
| 2021/0142711 | A1* | 5/2021 | Maeng | G09G 3/2003 |

(Continued)

FOREIGN PATENT DOCUMENTS

KR   10-0561851   3/2006
KR   10-0627492   9/2006

(Continued)

*Primary Examiner* — Andre L Matthews
(74) *Attorney, Agent, or Firm* — H.C. Park & Associates, PLC

(57) ABSTRACT

A display device having an optical sensor includes a display panel including display pixels; and a sensor controller; and sensor pixels, wherein the sensor pixels include an optical sensor located on a first area of the display panel, the display pixels display a pattern including a plurality of markers in the first area, the sensor pixels image the pattern to generate a first image, the sensor controller divides the first image into sub-images corresponding to the markers, the sensor controller calculates first representative coordinates obtained by adding an integer part and a decimal part with respect to the sub-images, a unit of the integer part is the number of the sensor pixels, and each of the integer part and the decimal part independently includes a first dimensional value for a first direction and a second dimensional value for a second direction orthogonal to the first direction.

18 Claims, 10 Drawing Sheets

(56) References Cited

U.S. PATENT DOCUMENTS

2021/0397841 A1* 12/2021 Robinson ............... G06V 20/20
2022/0067330 A1* 3/2022 Zhan .................. G06V 40/1353

FOREIGN PATENT DOCUMENTS

| KR | 10-1780231 | 9/2017 |
| KR | 10-1798622 | 11/2017 |
| KR | 10-1857933 | 5/2018 |
| KR | 10-1875349 | 7/2018 |
| KR | 10-2019-0079739 | 7/2019 |

* cited by examiner

DISPLAY DEVICE INCLUDING OPTICAL SENSOR AND MEASUREMENT METHOD FOR LOCATION OF OPTICAL SENSOR

CROSS-REFERENCE TO RELATED APPLICATION

This application claims priority from and the benefit of Korean Patent Application No. 10-2020-0083050 filed on Jul. 6, 2020, which is hereby incorporated by reference for all purposes as if fully set forth herein.

BACKGROUND

Field

Exemplary embodiments and implementations of the invention relate generally to a display device including an optical sensor and a measurement method for a location of an optical sensor.

Discussion of the Background

As information technology has developed, the importance of a display device, which is a connection medium between a user and information, has been highlighted. Accordingly, the use of display devices such as a liquid crystal display device, an organic light emitting display device, and a plasma display device has been increasing.

According to consumer demand, the display device may include various sensors such as a touch sensor, a fingerprint sensor, an illumination sensor, and a camera. Particularly, the fingerprint sensor is attached to a rear surface of a display panel, and may recognize ridges and valleys of a fingerprint based on information of a carrier (for example, light or ultrasound) passing through the display panel.

As discussed herein, because the carrier includes different background information according to an internal layout of a display panel through which the carrier passes, initial calibration is necessary to remove the background information and to leave only the fingerprint information.

However, after initial calibration is performed, when a location of the fingerprint sensor is unintentionally changed, it is required for the location of the fingerprint sensor to be updated to properly use calibration data. In addition to the fingerprint sensor, other sensors attached to the rear surface of the display panel may have the same problem.

The above information disclosed in this Background section is only for enhancement of understanding of the background of the invention, and therefore it may contain information that does not form the prior art that is already known in this country to a person of ordinary skill in the art.

SUMMARY

The present invention has been made in an effort to provide a display device including an optical sensor that may measure a location shift amount and a shift direction of an optical sensor in a decimal unit as well as an integer unit based on sensor pixels, and a measurement method for a location of the optical sensor.

Additional features of the inventive concepts will be set forth in the description which follows, and in part will be apparent from the description, or may be learned by practice of the inventive concepts.

A display device including an optical sensor according to an embodiment of the present invention includes a display panel including display pixels; and an optical sensor including a sensor controller and sensor pixels, the sensor pixels located on a first area of the display panel, wherein the display pixels display a pattern including a plurality of markers in the first area, the sensor pixels image the pattern to generate a first image, the sensor controller divides the first image into sub-images corresponding to the markers, the sensor controller calculates first representative coordinates obtained by adding an integer part and a decimal part with respect to the sub-images, a unit of the integer part is the number of the sensor pixels, and each of the integer part and the decimal part independently includes a first dimensional value for a first direction and a second dimensional value for a second direction orthogonal to the first direction.

The sensor controller, for respective sub-images, may determine a first dimensional value corresponding to a maximum value among average brightnesses with respect to first dimensional values as a first dimensional value of the integer part, and may determine a second dimensional value corresponding to a maximum value among average brightnesses with respect to second dimensional values as a second dimensional value of the integer part.

The sensor controller, for respective sub-images, may compare current brightnesses of first observation areas with previous brightnesses thereof to determine a first dimensional value of the decimal part.

Each of the first observation areas may be longer in the second direction than in the first direction, and the first observation areas may be located adjacent to each other in the first direction.

Each of the sub-images may include a first boundary whose brightness is rapidly changed with respect to the first direction, and at least one of the first observation areas may overlap the first boundary.

The sensor controller may determine that the first dimensional value of the decimal part has a first sign when current brightnesses of the first observation areas are smaller than previous brightnesses thereof, and the sensor controller may determine that the first dimensional value of the decimal part has a second sign opposite to the first sign when current brightnesses of the first observation areas are greater than previous brightnesses thereof.

The sensor controller, when current brightnesses of the first observation areas are smaller than previous brightnesses thereof and the current brightnesses of the first observation areas have uniform difference values from the previous brightnesses, may determine the first dimensional value of the decimal part as 0.

The sensor controller, for respective sub-images, may compare current brightnesses of second observation areas with previous brightnesses thereof to determine a second dimensional value of the decimal part.

Each of the second observation areas may be longer in the first direction than in the second direction, and the second observation areas may be located adjacent to each other in the second direction.

Each of the sub-images may include a second boundary whose brightness is rapidly changed with respect to the second direction, and at least one of the second observation areas may overlap the second boundary.

The sensor controller may determines that the second dimensional value of the decimal part has the first sign when current brightnesses of the second observation areas are smaller than previous brightnesses thereof, and the sensor controller may determine that the second dimensional value of the decimal part has the second sign when current brightnesses of the second observation areas are greater than previous brightnesses thereof.

The sensor controller may calculate a slope of the optical sensor by using the first representative coordinates and second representative coordinates of a second image generated at a different point of time from that of the first image.

The sensor controller may calculate at least one first slope with respect to the first direction and at least one second slope with respect to the second direction; when the at least one first slope and the at least one second slope are the same, the sensor controller may determine a third slope of a third direction orthogonal to the first and second directions as 0; and when at least one of the at least one first slope and the at least one second slope is different, the sensor controller may determine that the third slope is non-zero.

Another embodiment of the present invention provides a measurement method for a location of an optical sensor that is located on a first area of a display panel, the measurement method including displaying, by a display panel, a pattern including a plurality of markers on the first area; generating, by sensor pixels of the optical sensor, a first image by imaging the pattern; dividing, by a sensor controller of the optical sensor, the first image into sub-images corresponding to the markers; and calculating, by the sensor controller, first representative coordinates by summing an integer part and a decimal part with respect to the sub-images, wherein a unit of the integer part is the number of the sensor pixels, and each of the integer part and the decimal part independently includes a first dimensional value with respect to a first direction and a second dimensional value with respect to a second direction orthogonal to the first direction.

The measurement method for the location of the optical sensor may further include determining, by the sensor controller, for respective sub-images, a first dimensional value corresponding to a maximum value among average brightnesses with respect to first dimensional values as a first dimensional value of the integer part, and a second dimensional value corresponding to a maximum value among average brightnesses with respect to second dimensional values as a second dimensional value of the integer part.

The measurement method for the location of the optical sensor may further include comparing, by the sensor controller, for respective sub-images, current brightnesses of first observation areas with previous brightnesses thereof to determine a first dimensional value of the decimal part.

Each of the first observation areas may be longer in the second direction than in the first direction; the first observation areas may be located adjacent to each other in the first direction; each of the sub-images may include a first boundary whose brightness is rapidly changed with respect to the first direction, and at least one of the first observation areas may overlap the first boundary.

The measurement method for the location of the optical sensor may further include determining, by the sensor controller, that the first dimensional value of the decimal part has a first sign when current brightnesses of the first observation areas are smaller than previous brightnesses thereof, and that the first dimensional value of the decimal part has a second sign opposite to the first sign when current brightnesses of the first observation areas are greater than previous brightnesses thereof.

The measurement method for the location of the optical sensor may further include determining, by the sensor controller, the first dimensional value of the decimal part as 0 when current brightnesses of the first observation areas are smaller than previous brightnesses thereof and the current brightnesses of the first observation areas have uniform difference values from the previous brightnesses.

The measurement method for the location of the optical sensor may further include comparing, by the sensor controller, for respective sub-images, current brightnesses of second observation areas with previous brightnesses thereof to determine a second dimensional value of the decimal part.

The display device including the optical sensor and the measurement method for the location of the optical sensor according to the inventive concepts may measure a location shift amount and a shift direction of the optical sensor in a decimal unit as well as an integer unit based on sensor pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
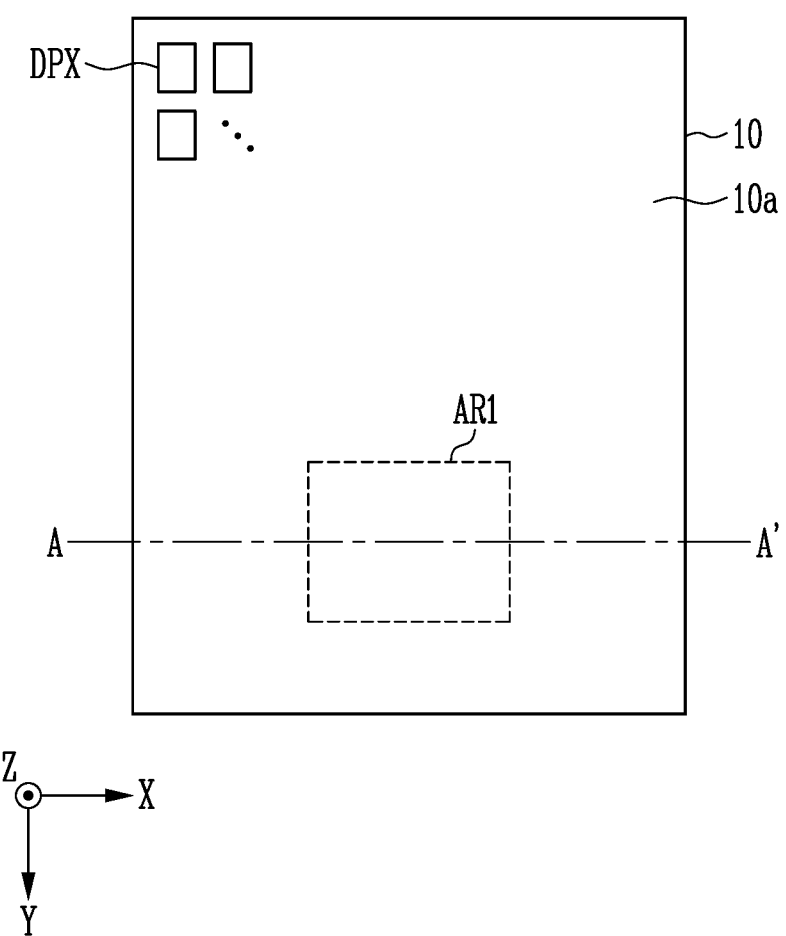
FIGS. 1, 2, and 3 illustrate schematic views for explaining a display device according to an embodiment of the inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are illustrated in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The inventive concepts will be described more fully hereinafter with reference to the accompanying drawings, in which embodiments of the invention are illustrated. As those skilled in the art would realize, the described embodiments may be modified in various different ways, all without departing from the spirit or scope of the inventive concepts.

Parts that are irrelevant to the description will be omitted to clearly describe the inventive concepts, and like reference numerals designate like elements throughout the specification. Therefore, the above-mentioned reference numerals may be used in other drawings.

Further, in the drawings, the size and thickness of each element are arbitrarily illustrated for ease of description, and the inventive concepts is not necessarily limited to those illustrated in the drawings. In the drawings, the thicknesses of layers, films, panels, regions, etc. may be exaggerated for clarity.

Figure 2:
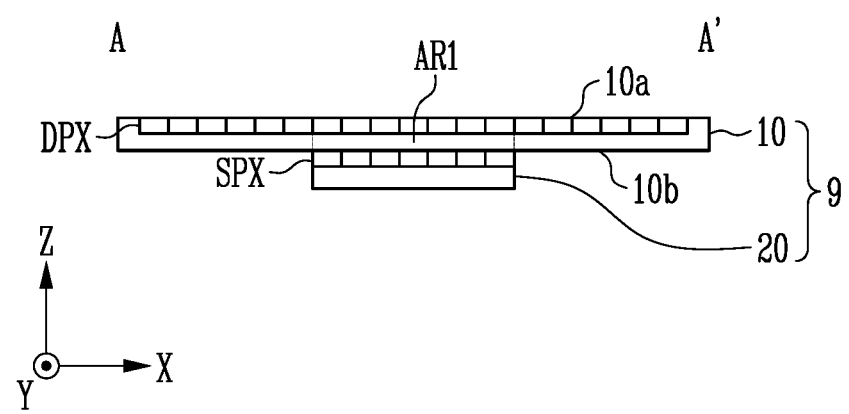
Figure 3:
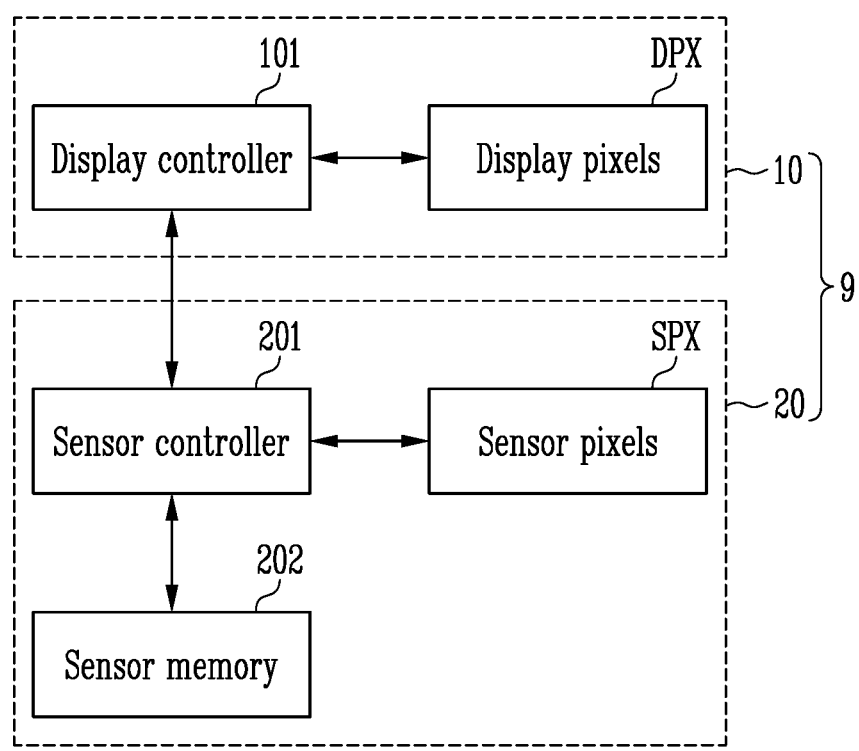

FIG. 1 to FIG. 3 illustrate schematic views for explaining a display device according to an embodiment of the inventive concepts. FIG. 2 illustrates an exemplary cross-sectional view taken along line A-A' of FIG. 1.

A first direction X, a second direction Y, and a third direction Z may be directions orthogonal to each other.

Referring to FIG. 1 to FIG. 3, a display device 9 may include a display panel 10 and an optical sensor 20.

The display panel 10 may include display pixels DPX and a display controller 101. The display pixels DPX may be arranged in a plane defined in the first direction X and the second direction Y. The display pixels DPX are not necessarily arranged in a planar shape, but may be arranged in a curved shape. Although not illustrated, for example, a side surface of the display panel 10 may be curved, and the display pixels DPX disposed on the side surface of the display panel 10 may be arranged in a curved shape. The display pixels DPX may emit light in the third direction Z to display an image. When a first surface 10a of the display panel 10 is viewed by a user, a displayed image may be viewed. The display controller 101 may receive RGB data, a control signal, and the like from an external processor to supply a data voltage, a control signal, and the like used for the display pixels DPX. A detailed configuration of the display panel 10 may be in accordance with the prior art.

The optical sensor 20 may include sensor pixels SPX, a sensor controller 201, and a sensor memory 202. The optical sensor 20 may be located on a first area AR1 of the display panel 10. For example, the optical sensor 20 may be attached to a second surface 10b of the display panel 10. The optical sensor 20 is a sensor in which light is a carrier, and may be a fingerprint sensor, a camera, an illumination sensor, or a proximity sensor. For convenience of description, hereinafter, it is assumed that the optical sensor 20 is a fingerprint sensor.

The sensor pixels SPX may be arranged in a plane defined in the first direction X and the second direction Y. The sensor pixels SPX may be configured according to a technology for a conventional optical sensor such as a CMOS sensor. The sensor pixels SPX may generate an image by transmitting through and capturing the first area AR1 of the display panel 10.

The sensor memory 202 may include location data of the sensor pixels SPX and calibration data based on the location data. Because layouts of the display panel 10 through which the carrier is transmitted are different depending on locations of respective sensor pixels SPX, it is useful to generate calibration data at least once before shipment of a product. Additionally, the calibration data may reflect a characteristic difference (distribution) between respective sensor pixels SPX.

The sensor controller 201 may generate a corrected image by applying calibration data to the image generated by the sensor pixels SPX. For example, when the image generated by the sensor pixels SPX includes both background information (for example, the layout of the display panel 10) and a fingerprint shape, the corrected image may include only the fingerprint shape in which the background information is removed. Therefore, authentication or the like of a user may be performed by using an obtained fingerprint shape.

Figure 4:
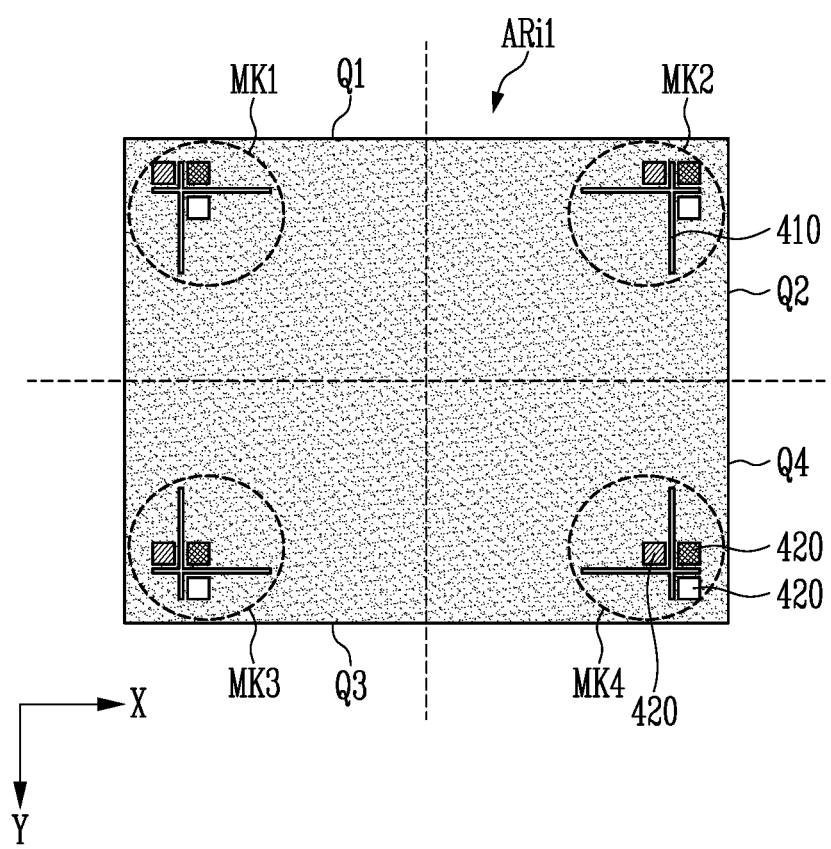
FIG. 4 illustrates a schematic view for explaining an image captured by an optical sensor according to an embodiment of the inventive concepts.

FIG. 4 illustrates a schematic view for explaining an image captured by an optical sensor according to an embodiment of the inventive concepts.

One way to check whether the location of the optical sensor 20 is changed, the display device 9 may periodically measure the location of the optical sensor 20. In addition, the location measurement of the optical sensor 20 may be aperiodically performed by the user.

First, the display pixels DPX may display a pattern including a plurality of markers MK1, MK2, MK3, and MK4 in the first area AR1. The sensor pixels SPX may image the pattern to generate an image ARi1.

Each of the markers MK1, MK2, MK3, and MK4 may have a higher brightness than a background of the image ARi1. For example, each of the markers MK1, MK2, MK3, and MK4 may include a cross figure 410. For example, each of the markers MK1, MK2, MK3, and MK4 may include box figures 420 of different grayscales within the cross figure. However, the shapes of the markers MK1, MK2, MK3, and MK4 may vary according to embodiments, and the present embodiment is not limited to the shapes of the markers MK1, MK2, MK3, and MK4 of FIG. 4. The markers MK1, MK2, MK3, and MK4 may be disposed at points of interest to desire to know coordinates.

The sensor controller 201 may divide the image ARi1 into sub-images Q1, Q2, Q3, and Q4 corresponding to the markers MK1, MK2, MK3, and MK4. For example, the image ARi1 may be a quadrangle, and the markers MK1, MK2, MK3, and MK4 may be located near respective vertexes of the quadrangle. For example, the sub-images Q1, Q2, Q3, and Q4 may be quadrants of the image ARi1. The sensor controller 201 may calculate representative coordinates summing integer parts and decimal parts for the sub-images Q1, Q2, Q3, and Q4.

In this case, a unit of the integer part may be the number of sensor pixels SPX. For example, when a difference between a previous representative coordinates and a current representative coordinates is 3 with respect to the first direction X, the result may be interpreted that the optical sensor 20 is shifted in the first direction X by a distance corresponding to a width of three sensor pixels SPX.

In this case, each of the integer part and the decimal part may independently include a first dimensional value for the first direction X and a second dimensional value for the second direction Y orthogonal to the first direction X. That is, the sensor controller 201 may calculate the first dimensional value of the representative coordinate by summing the first dimensional value of the integer part and the first dimensional value of the decimal part after separately calculating the integer part and the decimal part. The sensor controller 201 may calculate the second dimensional value of the representative coordinate by summing the second dimensional value of the integer part and the second dimensional value of the decimal part. The first dimensional value may be a coordinate value of an x-axis, and the second dimensional value may be a coordinate value of a y-axis.

According to embodiments described herein, it is possible to measure a shift direction of the decimal part as well as the integer part. Accordingly, even when the optical sensor 20 is finely moved in a decimal unit instead of an integer unit, it is possible to accurately measure a shift direction and a shift amount of the optical sensor 20.

Hereinafter, a method of calculating representative coordinates of the sub-image Q1 will be described. The representative coordinates of the other sub-images Q2, Q3, and Q4 may also be calculated in the same way, so a duplicate description is omitted.

Figure 5:
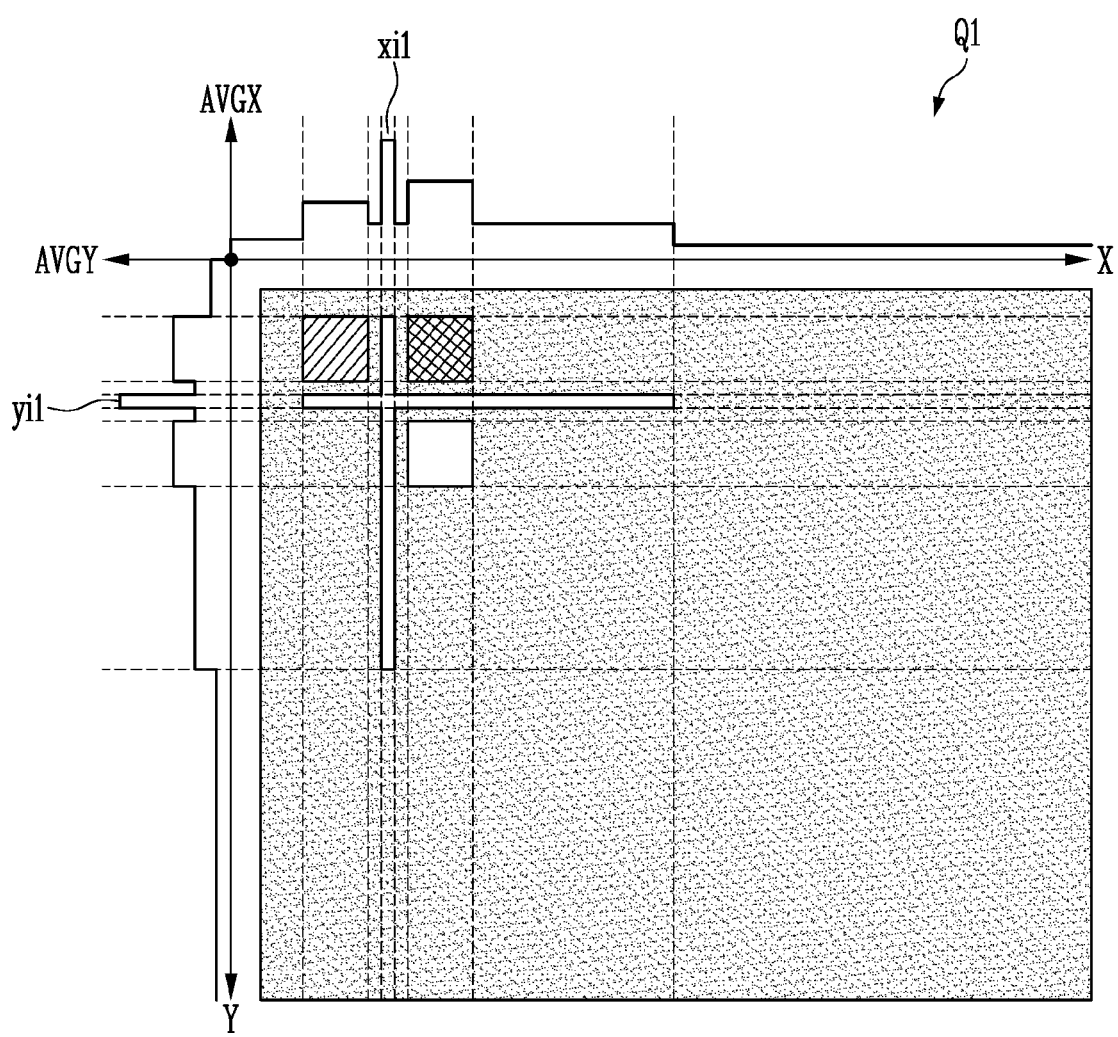
FIG. 5 illustrates a schematic view for explaining a method of calculating an integer part of representative coordinates of a sub-image according to an embodiment of the inventive concepts.

FIG. 5 illustrates a schematic view for explaining a method of calculating an integer part of representative coordinates of a sub-image according to an embodiment of the inventive concepts.

For respective sub-images Q1, Q2, Q3, and Q4, the sensor controller 201 may determine a first dimensional value corresponding to a maximum value among average brightnesses AVGX for the first dimensional values as a first dimensional value $xi1$ of the integer part. In addition, for respective sub-images Q1, Q2, Q3, and Q4, the sensor controller 201 may determine a second dimensional value corresponding to a maximum value among average brightnesses AVGY for the second dimensional values as a second dimensional value $yi1$ of the integer part.

For example, the average brightness AVGX of sensing values (brightnesses) of the sensor pixels SPX at the same location with respect to the first direction X may correspond to a height of a graph. For example, because the sensing values of the sensor pixels SPX that are located with respect to the first direction X correspond to the background of the image ARi1, the average brightness AVGX may be the smallest. Meanwhile, because the sensing values of the sensor pixels SPX located at an $xi1$-th with respect to the first direction X include a portion of the cross figure extending in the second direction Y, the average brightness AVGX may be the maximum.

For example, the average brightness AVGY of sensing values (brightnesses) of the sensor pixels SPX at the same location with respect to the second direction Y may correspond to a height of a graph. For example, because the sensing values of the sensor pixels SPX that are first located with respect to the second direction Y correspond to the background of the image ARi1, the average brightness AVGY may be the smallest. Meanwhile, because the sensing values of the sensor pixels SPX located at a yi1-th with respect to the second direction Y include a portion of the cross figure extending in the first direction X, the average brightness AVGY may be the maximum.

FIG. 6 to FIG. 9 illustrate schematic views for explaining a method of calculating a decimal part of representative coordinates of a sub-image according to an embodiment of the inventive concepts.

Figure 6:
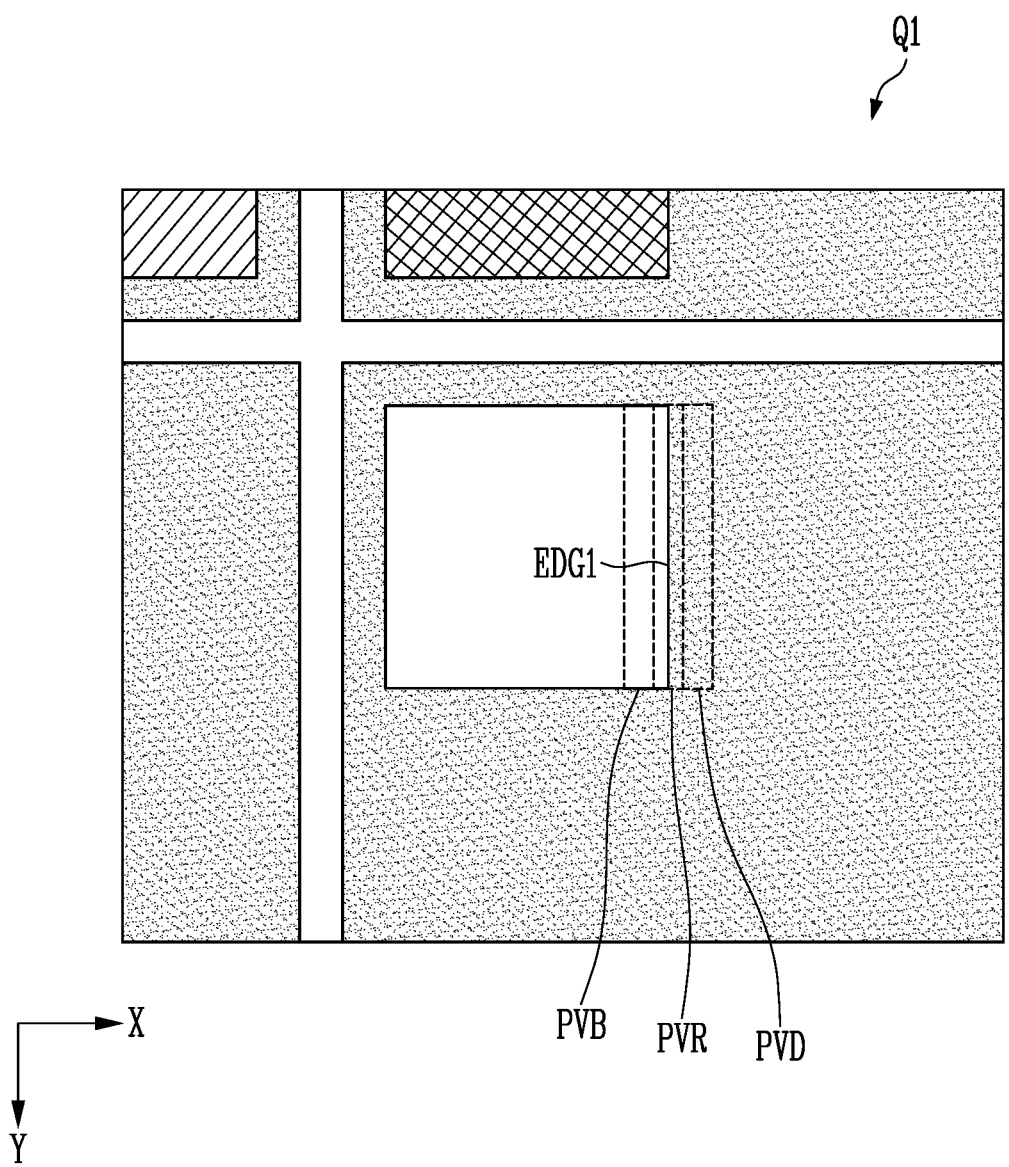
FIGS. 6, 7, 8, and 9 illustrate schematic views for explaining a method of calculating a decimal part of representative coordinates of a sub-image according to an embodiment of the inventive concepts.

Referring to FIG. 6, the sensor controller 201 may compare current brightnesses of first observation areas PVB, PVR, and PVD with respect to the sub-images Q1, Q2, Q3, and Q4 with previous brightnesses thereof to determine a first dimensional value of the decimal part. The current brightness refers to the brightnesses of the first observation areas PVB, PVR, and PVD in the image ARi1 captured at a current point of time. The previous brightness refers to the brightnesses of the first observation areas PVB, PVR, and PVD in the image captured at a past point of time.

Each of the first observation areas PVB, PVR, and PVD may have a shape longer in the second direction Y than in the first direction X. For example, each of the first observation areas PVB, PVR, and PVD may be a quadrangle that is longer in the second direction Y than in the first direction X. Sizes and shapes of the first observation areas PVB, PVR, and PVD may be the same.

The first observation areas PVB, PVR, and PVD may be located adjacent to each other in the first direction X. For example, the first observation areas PVB, PVR, and PVD may contact each other in the first direction X.

Each of the sub-images Q1, Q2, Q3, and Q4 may include a first boundary EDG1 whose brightness is rapidly changed with respect to the first direction X. For example, the sub-image Q1 may include the first boundary EDG1 whose brightness is rapidly changed with respect to the first direction X. In the embodiment of FIG. 6, the first boundary EDG1 of a white box figure located in the first direction X and the second direction Y from the cross figure is used.

At least one of the first observation areas PVB, PVR, and PVD may overlap the first boundary EDG1. For example, the first observation area PVR may overlap the first boundary EDG1. A length of the first observation area PVR with respect to the second direction Y may be the same as a length of the first boundary EDG1. The first observation area PVB may overlap the white box. The first observation area PVD may overlap the background.

Figure 7:
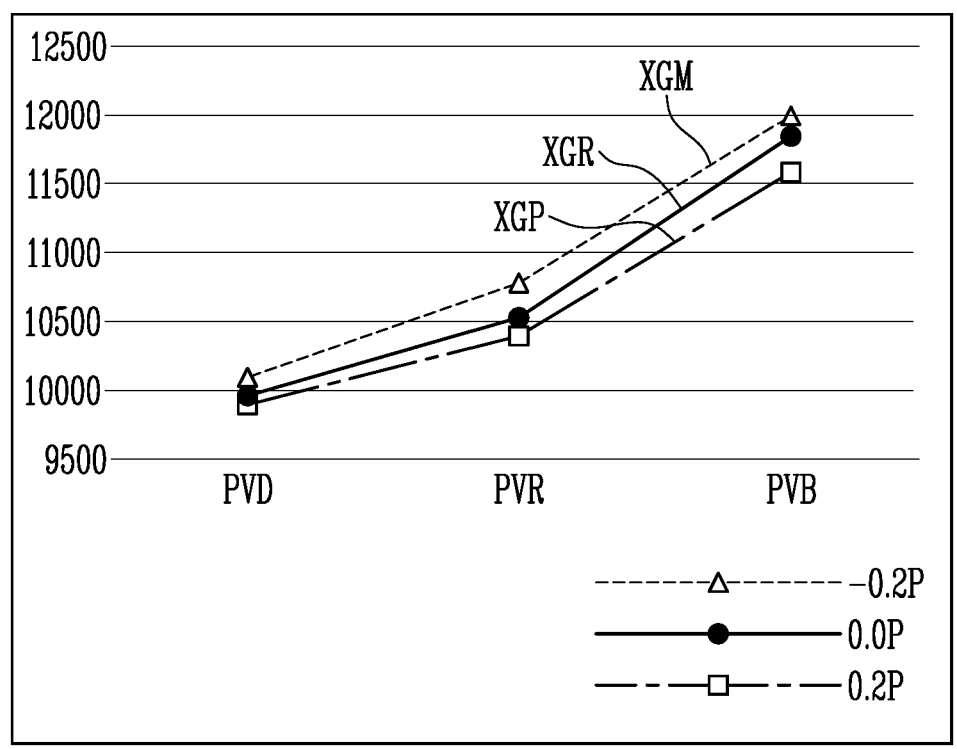

Referring to FIG. 7, a graph XGR for previous brightnesses of the first observation areas PVB, PVR, and PVD and graphs XGP and XGM of different cases for current brightnesses of the first observation areas PVB, PVR, and PVD are exemplarily illustrated. Each of the graphs XGR, XGP, and XGM is one connecting the brightnesses of the first observation areas PVB, PVR, and PVD with a straight line.

When the current brightnesses of the first observation areas PVB, PVR, and PVD are smaller than the previous brightnesses thereof, the sensor controller 201 may determine that the first dimensional value of the decimal part has a first sign. For example, when the current brightnesses of the first observation areas PVB, PVR, and PVD correspond to the graph XGP, the current brightnesses are smaller than the previous brightnesses of the graph XGR. In this case, because the sensor pixels SPX are shifted in the first direction X with respect to the display panel 10, the first dimensional value of the decimal part may have a (+) sign. An amount shifted in the first direction X may be calculated by various algorithms according to the location, size, and shape of the first observation areas PVB, PVR, and PVD. For example, in the embodiment of FIG. 7, the first dimensional value of the decimal part may be (+)0.2. This is a shift amount corresponding to ⅕ of the width of the sensor pixel. Accordingly, the first dimensional value of the representative coordinates of the sub-image Q1 may be xi1+0.2.

When the current brightnesses of the first observation areas PVB, PVR, and PVD are greater than the previous brightnesses thereof, the sensor controller 201 may determine that the first dimensional value of the decimal part has a second sign opposite to the first sign. For example, when the current brightnesses of the first observation areas PVB, PVR, and PVD correspond to the graph XGM, the current brightnesses are greater than the previous brightnesses of the graph XGR. In this case, because the sensor pixels SPX are shifted in the opposite direction of the first direction X with respect to the display panel 10, the first dimensional value of the decimal part may have a (−) sign. An amount shifted in the first direction X may be calculated by various algorithms according to the location, size, and shape of the first observation areas PVB, PVR, and PVD. For example, in the embodiment of FIG. 7, the first dimensional value of the decimal part may be (−)0.2. This is a shift amount corresponding to ⅕ of the width of the sensor pixel. Accordingly, the first dimensional value of the representative coordinates of the sub-image Q1 may be xi1−0.2.

According to the present embodiment, it is possible to know the shift direction and the shift amount of the decimal part as well as the integer part. Therefore, when the shift amount of the integer part of the optical sensor 20 is 0 and the shift amount of the decimal part is not 0, that is, even when the optical sensor 20 is finely shifted, it is possible to know an exact shift direction.

The representative coordinates of the sub-images Q1, Q2, Q3, and Q4 calculated according to the present embodiment may be stored in the sensor memory 202. Accordingly, the calibration data may be used for image correction based on the corrected representative coordinates.

Figure 8:
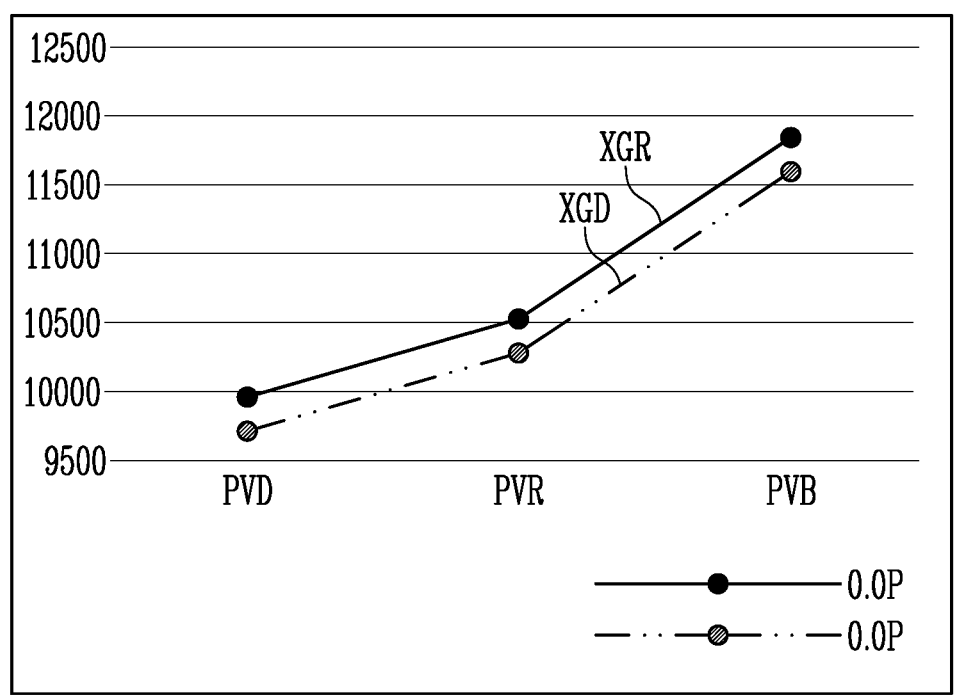

Referring to FIG. 8, a graph XGR for previous brightnesses of the first observation areas PVB, PVR, and PVD and a graph XGD for current brightnesses of the first observation areas PVB, PVR, and PVD are exemplarily illustrated. Each of the graphs XGR and XGD is one connecting the brightnesses of the first observation areas PVB, PVR, and PVD with a straight line.

When the current brightnesses of the first observation areas PVB, PVR, and PVD are smaller than the previous brightnesses thereof and when the current brightnesses of the first observation areas PVB, PVR, and PVD have uniform difference values from the previous brightnesses thereof, the sensor controller 201 may determine the first dimensional value of the decimal part as 0. A range of uniform difference values may be variously determined according to the location, size, and shape of the first observation areas PVB, PVR, and PVD.

For example, when the current brightnesses of the first observation areas PVB, PVR, and PVD are smaller than the previous brightnesses thereof and when the current brightnesses of the first observation areas PVB, PVR, and PVD have uniform difference values from the previous brightnesses thereof, the graph XGD of the current brightnesses may have a shape substantially the same as the graph XGR, but may have a shape shifted downward with respect to a brightness axis. This case may be a case in which the sensor pixels SPX is not shifted, but the display pixels DPX deteriorates and thus brightness decreases. That is, although the current brightness of the first observation area PVR is reduced from the previous brightness in both the graph XGP of FIG. 7 and the graph XGD of FIG. 8, it may be determined that a shift occurs in the case of the graph XGP of FIG. 7 and no shift occurs in the case of the graph XGD of FIG. 8.

Therefore, according to example embodiments, a plurality of first observation areas PVB, PVR, and PVD are observed to measure relative shifts. Thus it is possible to prevent a case in which only one first observation area PVR is observed to incorrectly determine that a shift occurs.

Figure 9:
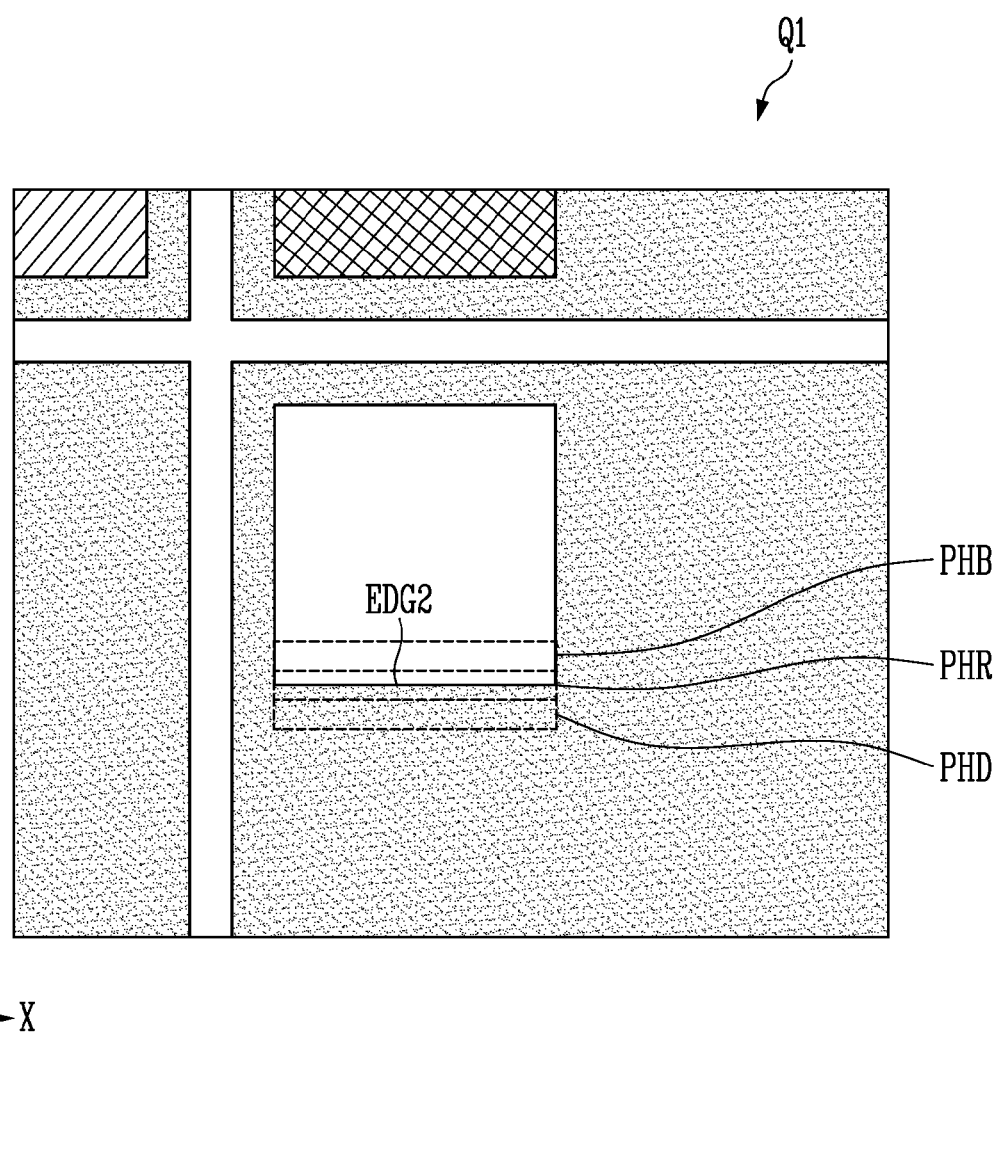

Referring to FIG. 9, the sensor controller 201 may compare current brightnesses of second observation areas PHB, PHR, and PHD with respect to the sub-images Q1, Q2, Q3, and Q4 with previous brightnesses thereof to determine a second dimensional value of the decimal part. The current brightness refers to the brightnesses of the second observation areas PHB, PHR, and PHD in the image ARi1 captured at a current point of time. The previous brightness refers to the brightnesses of the second observation areas PHB, PHR, and PHD in the image captured at a past point of time.

Each of the second observation areas PHB, PHR, and PHD may have a shape longer in the first direction X than in the second direction Y. For example, each of the second observation areas PHB, PHR, and PHD may have a quadrangle longer in the first direction X than in the second direction Y. Sizes and shapes of the second observation areas PHB, PHR, and PHD may be the same.

The second observation areas PHB, PHR, and PHD may be located adjacent to each other in the second direction Y. For example, the second observation areas PHB, PHR, and PHD may contact each other in the second direction Y.

Each of the sub-images Q1, Q2, Q3, and Q4 may include a second boundary EDG2 whose brightness is rapidly changed with respect to the second direction Y. For example, the sub-image Q1 may include the second boundary EDG2 whose brightness is rapidly changed with respect to the second direction Y. In the embodiment of FIG. 9, the second boundary EDG2 of a white box figure located in the first direction X and the second direction Y from the cross figure is used.

At least one of the second observation areas PHB, PHR, and PHD may overlap the second boundary EDG2. For example, the second observation area PHR may overlap the second boundary EDG2. A length of the second observation area PHR with respect to the first direction X may be the same as a length of the second boundary EDG2. The second observation area PHB may overlap the white box. The second observation area PHD may overlap the background.

When the current brightnesses of the second observation areas PHB, PHR, and PHD are smaller than the previous brightnesses thereof, the sensor controller 201 may determine that the second dimensional value of the decimal part has a first sign. In addition, when the current brightnesses of the second observation areas PHB, PHR, and PHD are greater than the previous brightnesses thereof, the sensor controller 201 may determine that the second dimensional value of the decimal part has a second sign. Because this is substantially the same as the description of FIG. 7, a duplicate description is omitted.

When the current brightnesses of the second observation areas PHB, PHR, and PHD are smaller than the previous brightnesses thereof and when the current brightnesses of the second observation areas PHB, PHR, and PHD have uniform difference values from the previous brightnesses thereof, the sensor controller 201 may determine the second dimensional value of the decimal part to be 0. Because this is substantially the same as the description of FIG. 8, a duplicate description is omitted.

Figure 10:
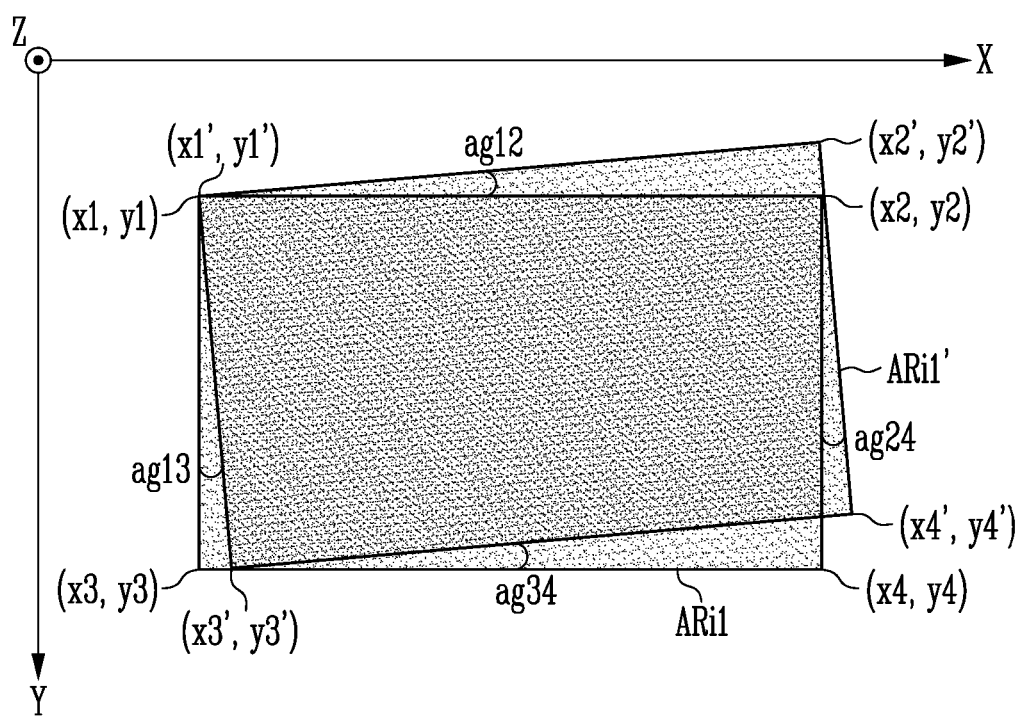
FIG. 10 illustrates a schematic view for explaining a method of calculating a slope of an optical sensor according to an embodiment of the inventive concepts.

FIG. 10 illustrates a schematic view for explaining a method of calculating a slope of an optical sensor according to an embodiment of the inventive concepts.

Referring to FIG. 10, a first image ARi1 generated at a first point of time and a second image ARi1' generated at a second point of point other than the first point of time are exemplarily illustrated. For example, the second point of time may be a next measurement point of time to the first point of time. It is assumed that first representative coordinates (x1, y1), (x2, y2), (x3, y3), and (x4, y4) are calculated based on the sub-images Q1, Q2, Q3, and Q4 of the first image ARi1 and second representative coordinates (x1', y1'), (x2', y2'), (x3', y3'), and (x4', y4') are calculated based on the sub-images of the second image ARi1'. For convenience of description, it is assumed that the first representative coordinates (x1, y1) and the second representative coordinates (x1', y1') are the same. For convenience of description, it is assumed that the first image ARi1 is a quadrangle connecting four first representative coordinates (x1, y1), (x2, y2), (x3, y3), and (x4, y4). For convenience of description, it is assumed that the second image ARi1' is a quadrangle connecting four second representative coordinates (x1', y1'), (x2', y2'), (x3', y3'), and (x4', y4').

The sensor controller 201 may use the second representative coordinates (x1', y1'), (x2', y2'), (x3', y3'), and (x4', y4') of the second image ARi1' generated at a different point of time from the first image ARi1 and the first representative coordinates (x1, y1), (x2, y2), (x3, y3), and (x4, y4) to calculate slopes ag12, ag34, ag13, and ag24 of the optical sensor 20. For example, the sensor controller 201 may calculate at least one first slope ag12 or ag34 with respect to the first direction X, and at least one second slope ag13 or ag24 with respect to the second direction Y.

For example, the slope ag12 may be calculated by Equation 1 below by using the first representative coordinates (x1, y1) and the second representative coordinates (x2', y2').

$$\cos(ag12) = (x2'-x1)/\sqrt{(x2'-x1)^2 + (y2'-y1)^2}$$ [Equation 1]

Other slopes ag34, ag13, and ag24 may also be calculated in substantially the same way, so a redundant description is omitted. Therefore, according to the present embodiment, it is possible to calculate a shift amount and shift direction of the slope in the plane of the optical sensor 20.

When at least one first slope ag12 or ag34 and at least one second slope ag13 or ag24 are all the same, the sensor controller 201 may determine a third slope of the third direction Z perpendicular to the first and second directions X and Y as 0. For example, when all of the slopes ag12, ag34, ag13, ag24 are the same, the optical sensor 20 may determine that the slopes are inclined only on the plane (the first direction X and the second direction Y), and are not inclined in the vertical direction (the third direction Z).

The sensor controller 201 may determine that the third slope is not 0 when at least one of the first slopes ag12 and ag34 and at least one second slope ag13 or ag24 is different. For example, when at least two of the slopes ag12, ag34, ag13, and ag24 are different, the optical sensor 20 may determine that they are inclined in the vertical direction as well as in the plane direction.

Therefore, according to the present embodiment, it is possible to determine whether or not the slope in the plane direction of the optical sensor 20 and the slope in the vertical direction thereof are different from each other.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the inventive concepts are possible. Consequently, the true technical protective scope of the inventive concepts must be determined based on the technical spirit of the appended claims.

What is claimed is:

1. A display device comprising:
   a display panel including display pixels; and
   an optical sensor including a sensor controller and sensor pixels, the sensor pixels located on a first area of the display panel,
   wherein the display pixels display a pattern including a plurality of markers in the first area,
   wherein the sensor pixels image the pattern to generate a first image,
   wherein the sensor controller divides the first image into sub-images corresponding to the markers,
   wherein the sensor controller calculates first representative coordinates obtained by adding an integer part and a decimal part with respect to the sub-images,
   wherein a unit of the integer part is the number of the sensor pixels, and
   wherein each of the integer part and the decimal part independently includes a first dimensional value for a first direction and a second dimensional value for a second direction orthogonal to the first direction,
   wherein the sensor controller, for respective sub-images, determines a first dimensional value corresponding to a maximum value among average brightnesses with respect to first dimensional values as a first dimensional value of the integer part, and determines a second dimensional value corresponding to a maximum value among average brightnesses with respect to second dimensional values as a second dimensional value of the integer part.

2. A display device of comprising:
   a display panel including display pixels; and
   an optical sensor including a sensor controller and sensor pixels, the sensor pixels located on a first area of the display panel,
   wherein the display pixels display a pattern including a plurality of markers in the first area,
   wherein the sensor pixels image the pattern to generate a first image,
   wherein the sensor controller divides the first image into sub-images corresponding to the markers,
   wherein the sensor controller calculates first representative coordinates obtained by adding an integer part and a decimal part with respect to the sub-images,
   wherein a unit of the integer part is the number of the sensor pixels,
   wherein each of the integer part and the decimal part independently includes a first dimensional value for a first direction and a second dimensional value for a second direction orthogonal to the first direction, and
   wherein the sensor controller, for respective sub-images, compares current brightnesses of first observation areas with previous brightnesses thereof to determine a first dimensional value of the decimal part.

3. The display device of claim 2, wherein each of the first observation areas is longer in the second direction than in the first direction, and
   wherein the first observation areas are located adjacent to each other in the first direction.

4. The display device of claim 3, wherein each of the sub-images includes a first boundary whose brightness is rapidly changed with respect to the first direction, and
   wherein at least one of the first observation areas overlaps the first boundary.

5. The display device of claim 4, wherein the sensor controller determines that the first dimensional value of the decimal part has a first sign when current brightnesses of the first observation areas are smaller than previous brightnesses thereof, and
   wherein the sensor controller determines that the first dimensional value of the decimal part has a second sign opposite to the first sign when current brightnesses of the first observation areas are greater than previous brightnesses thereof.

6. The display device of claim 5, wherein the sensor controller, when current brightnesses of the first observation areas are smaller than previous brightnesses thereof and the current brightnesses of the first observation areas have uniform difference values from the previous brightnesses, determines the first dimensional value of the decimal part as 0.

7. The display device of claim 5, wherein the sensor controller, for respective sub-images, compares current brightnesses of second observation areas with previous brightnesses thereof to determine a second dimensional value of the decimal part.

8. The display device of claim 7, wherein each of the second observation areas is longer in the first direction than in the second direction, and
   wherein the second observation areas are located adjacent to each other in the second direction.

9. The display device of claim 8, wherein each of the sub-images includes a second boundary whose brightness is rapidly changed with respect to the second direction, and
   wherein at least one of the second observation areas overlaps the second boundary.

10. The display device of claim 9, wherein the sensor controller determines that the second dimensional value of the decimal part has the first sign when current brightnesses of the second observation areas are smaller than previous brightnesses thereof, and
    wherein the sensor controller determines that the second dimensional value of the decimal part has the second sign when current brightnesses of the second observation areas are greater than previous brightnesses thereof.

11. A display device of comprising:
    a display panel including display pixels; and
    an optical sensor including a sensor controller and sensor pixels, the sensor pixels located on a first area of the display panel,
    wherein the display pixels display a pattern including a plurality of markers in the first area,
    wherein the sensor pixels image the pattern to generate a first image,
    wherein the sensor controller divides the first image into sub-images corresponding to the markers, wherein the sensor controller calculates first representative coordinates obtained by adding an integer part and a decimal part with respect to the sub-images,
wherein a unit of the integer part is the number of the sensor pixels,
wherein each of the integer part and the decimal part independently includes a first dimensional value for a first direction and a second dimensional value for a second direction orthogonal to the first direction, and
wherein the sensor controller calculates a slope of the optical sensor by using the first representative coordinates and second representative coordinates of a second image generated at a different point of time from that of the first image.

12. The display device of claim 11, wherein the sensor controller calculates at least one first slope with respect to the first direction and at least one second slope with respect to the second direction;
wherein when the at least one first slope and the at least one second slope are the same, the sensor controller determines a third slope of a third direction orthogonal to the first and second directions as 0; and
wherein when at least one of the at least one first slope and the at least one second slope is different, the sensor controller determines that the third slope is non-zero.

13. A measurement method for a location of an optical sensor that is located on a first area of a display panel, the measurement method comprising:
displaying, by a display panel, a pattern including a plurality of markers on the first area;
generating, by sensor pixels of the optical sensor, a first image by imaging the pattern;
dividing, by a sensor controller of the optical sensor, the first image into sub-images corresponding to the markers;
calculating, by the sensor controller, first representative coordinates by summing an integer part and a decimal part with respect to the sub-images; and
determining, by the sensor controller, for respective sub-images, a first dimensional value corresponding to a maximum value among average brightnesses with respect to first dimensional values as a first dimensional value of the integer part, and a second dimensional value corresponding to a maximum value among average brightnesses with respect to second dimensional values as a second dimensional value of the integer part,
wherein a unit of the integer part is the number of the sensor pixels, and
wherein each of the integer part and the decimal part independently includes a first dimensional value with respect to a first direction and a second dimensional value with respect to a second direction orthogonal to the first direction.

14. A measurement method for a location of a optical sensor that is located on a first area of a display panel, the measurement method comprising:
displaying, by a display panel, a pattern including a plurality of markers on the first area;
generating, by sensor pixels of the optical sensor, a first image by imaging the pattern;
dividing, by a sensor controller of the optical sensor, the first image into sub-images corresponding to the markers;
calculating, by the sensor controller, first representative coordinates by summing an integer part and a decimal part with respect to the sub-images; and
comparing, by the sensor controller, for respective sub-images, current brightnesses of first observation areas with previous brightnesses thereof to determine a first dimensional value of the decimal part.

15. The measurement method for the location of the optical sensor of claim 14, wherein each of the first observation areas is longer in the second direction than in the first direction;
wherein the first observation areas are located adjacent to each other in the first direction;
wherein each of the sub-images includes a first boundary whose brightness is rapidly changed with respect to the first direction, and
wherein at least one of the first observation areas overlaps the first boundary.

16. The measurement method for the location of the optical sensor of claim 15, further comprising:
determining, by the sensor controller, that the first dimensional value of the decimal part has a first sign when current brightnesses of the first observation areas are smaller than previous brightnesses thereof, and that the first dimensional value of the decimal part has a second sign opposite to the first sign when current brightnesses of the first observation areas are greater than previous brightnesses thereof.

17. The measurement method for the location of the optical sensor of claim 16, further comprising:
determining, by the sensor controller, the first dimensional value of the decimal part as 0 when current brightnesses of the first observation areas are smaller than previous brightnesses thereof and the current brightnesses of the first observation areas have uniform difference values from the previous brightnesses.

18. The measurement method for the location of the optical sensor of claim 16, further comprising:
comparing, by the sensor controller, for respective sub-images, current brightnesses of second observation areas with previous brightnesses thereof to determine a second dimensional value of the decimal part.

* * * * *